United States Patent

[11] 3,562,631

| [72] | Inventors | Major C. Lee<br>Newport News;<br>William F. White, Hampton, Va. |
|---|---|---|
| [21] | Appl. No. | 811,037 |
| [22] | Filed | Mar. 27, 1969 |
| [45] | Patented | Feb. 9, 1971 |
| [73] | Assignee | The United States of America as represented by the Administrator of the National Aeronautics and Space Administration |

[54] DUAL RESONANT CAVITY ABSORPTION CELL
5 Claims, 2 Drawing Figs.

[52] U.S. Cl.................................................. 324/0.5, 324/58.5
[51] Int. Cl.................................................. G01n 27/78
[50] Field of Search............................................324/0.5, 58, 58.5, Lit.; 331/3, 94; 333/83, 98, Plasma

[56] References Cited
UNITED STATES PATENTS
3,150,313  9/1964  Dehmelt...................... 324/0.5

OTHER REFERENCES
R. C. Woods, A.M. Ronn & E. Bright Wilson Jr. - Double Resonance Modulated Microwave Spectrometer - Rev. of Sci. Instruments - 37(7) - July; 1966 - pp. 927— 933

Primary Examiner—Michael J. Lynch
Attorneys—Howard J. Osborn, William H. King and G. T. McCoy ABSTRACT: An absorption cell for holding a gas sample to be analyzed by microwave double resonance spectroscopy. A pair of Fabry-Perot interferometers are arranged in the cell so that their microwave fields propagate at right angles. One interferometer acts as a resonant cavity at the pumping frequency and the second as a resonant cavity at the observing frequency. Double resonance transitions occur in the volume common to both microwave fields.

PATENTED FEB 9 1971         3,562,631

INVENTORS
MAJOR C. LEE
WILLIAM F. WHITE

BY

*T. H. McCoy*
*William H. King*

ATTORNEYS

DUAL RESONANT CAVITY ABSORPTION CELL

ORIGIN OF THE INVENTION

The invention described herein was made by an employee of the U.S. Government and may be manufactured and used by or for the Government for governmental purposes without the payment of any royalties thereon or therefor.

The invention relates generally to microwave spectroscopy and more specifically concerns an absorption cell which holds the gas sample to be analyzed by microwave double resonance spectroscopy.

In microwave spectroscopy, radiation is passed through a cell which contains the gaseous molecules of interest. At microwave frequencies equal to the separation of molecular rotational energy levels, microwave power is absorbed. Absorption frequencies are characteristic of the structure of the molecules.

The sensitivity of the absorption detection is enhanced in the Stark modulated spectrometer by the introduction of an alternating electric field applied transverse to the direction of propagation of the microwave power, the perturbation of the gas molecules due to the applied electric field is called the Stark effect and results in a modulation of the amount of power absorbed by the gas. Utilizing the applied electric field modulation, cross-correlation detection techniques can be used to obtain greatly increased signal-to-noise ratios over direct absorption detection.

For a mixture possessing a rich microwave spectra, Stark modulation can cause interference from neighboring or overlapping lines. Microwave double resonance spectroscopy allows a selective modulation of energy transitions and eliminates the interference problem. It affords an extremely precise method for identifying individual components of a mixture with only one observed double resonance needed for each identification.

Previously there has been developed a double resonance spectrometer that utilizes an absorption cell consisting of 100 feet of copper X-band waveguide coiled to reduce space requirements. The disadvantages of a waveguide cell are numerous. Power losses, reflections, and multimoding occur due to the use of oversized waveguide and waveguide components, and to the coiling of the waveguide which is necessary to provide long paths in a reasonable physical space. It is difficult to isolate the pumping frequency from the detector unless the two frequencies differ by at least one waveguide band. The waveguide cell has a large surface area and small volume due to its small cross section. Thus molecules in the gas sample frequently strike a surface and many are absorbed onto the surface. This causes changes in the sample during observation, and makes evacuation of the cell difficult since these molecules slowly outgas during pumping out of the cell. Long paths through the gas are necessary to get an acceptable sensitivity, which means that the waveguide cell must be physically large even if it is coiled.

It is therefore an object of this invention to provide a microwave double resonance spectroscopy absorption cell that has improved microwave characteristics.

Another object of this invention is to provide a microwave double resonance spectroscopy absorption cell that has improved vacuum characteristics.

A further object of this invention is to provide a microwave double resonance spectroscopy absorption cell that can be made much smaller physically than previous absorption cells.

Still another object of this invention is to provide a microwave double resonance spectrometer that has improved vacuum and microwave characteristics.

Other objects and advantages of this invention will become apparent hereinafter and in the drawings in which.

Figure 1:
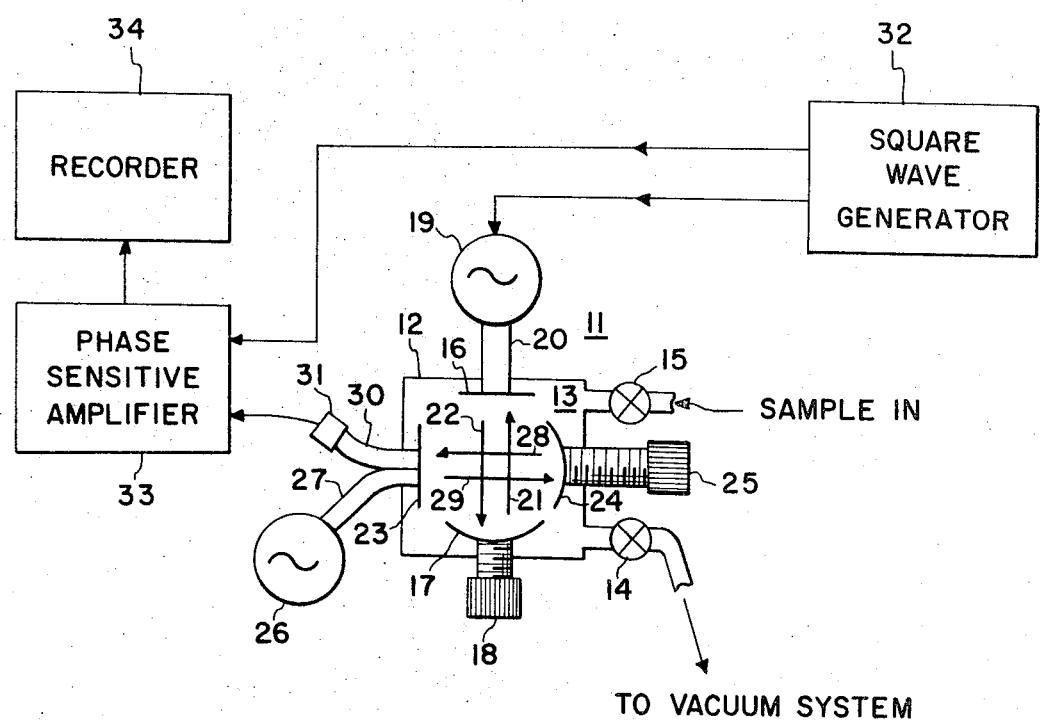
FIG. 1 is a schematic diagram of the invention.

In describing the embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the number 11 designates the absorption cell which constitutes this invention. Absorption cell 11 includes walls 12 which are made out of any suitable material to form a vacuum-tight cell 13. A valve 14 connects cell 13 to a vacuum system for the purpose of pumping cell 13 to a vacuum. A valve 15 is then utilized for the purpose of injecting a sample of the gas to be tested into cell 13. A first Fabry-Perot interferometer including a flat mirror 16 and a curved mirror 17 is suitably mounted in cell 13. A suitable tuning means 18 located outside cell 13 is attached to mirror 17 for moving it closer to or further away from mirror 16. A microwave source 19 having a frequency $f_1$ is connected through a waveguide 20 and a small opening in flat mirror 16 to cell 13. Hence as is well known in Fabry-Perot interferometers the microwave power from source 19 propagates back and forth between mirrors 16 and 17 as indicated by arrows 21 and 22. A second Fabry-Perot interferometer including flat mirror 23 and curved mirror 24 is mounted in cell 13 at right angles to the first interferometer. A suitable tuning means 25 is attached to curved mirror 24 for moving mirror 24 closer to or further away from flat mirror 23. A second microwave source 26 having a frequency $f_2$ and having an electric field parallel to the electric field of source 19 is connected to cell 13 through a waveguide 27 and a small opening in flat mirror 23. The power from source 26 propagates back and forth between mirrors 23 and 24 as indicated by arrows 28 and 29. An additional small opening is located in flat mirror 23 for the purpose of allowing a small amount of the power in cell 13 to flow through a waveguide 30 to a detector 31. A square wave generator 32 having a frequency of $f_m$ frequency modulates microwave source 19. The outputs from square wave generator 32 and detector 31 are connected to a phase sensitive amplifier 33 which allows recorder 34 to record only that portion of the detector output which has the same frequency and phase as the signal $f_m$ from generator 32. Hence, the output of detector 31 is phase-locked with the signal $f_m$.

Figure 2:
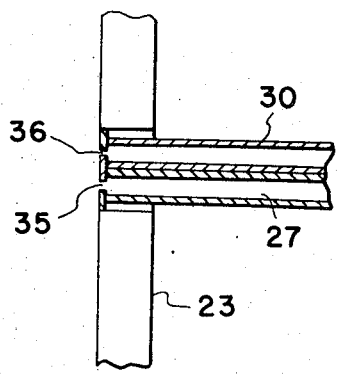
FIG. 2 is a schematic drawing showing how microwave power is injected into and removed from the absorption cell that constitutes this invention.

FIG. 2 is a schematic drawing of how microwave power from source 26 is injected into cell 13 and how power is removed from the cell. The power f from source 26 propagates through waveguide 27 and a small opening 35 into cell 13; and power from cell 13 propagates through a small opening 36 and waveguide 30 to detector 31. In a similar manner power from source 19 propagates through waveguide 20 and a small opening in mirror 16 into cell 13.

In the operation of this invention the cell 13 is pumped to a vacuum through valve 14 and then a sample of the gas to be analyzed is allowed to flow into cell 13 by means of valve 15. Then the cavities of the two interferometers are tuned to the frequencies $f_1$ and $f_2$ of sources 19 and 26 by means of tuning knobs 18 and 25, respectively. Then pumping frequency source 19, observing frequency source 26 and square wave generator 32 are all turned on. Thus the frequency $f_1$ of source 19 is modulated by $f_m$ the frequency of square wave generator 32. This modulation reaches detector 31 only through the double resonance phenomenon. Any single resonance absorption at $f_2$ is unmodulated and is not observed. Any single resonance absorption at $f_1$ is modulated but does not propagate through opening 36 and hence is not observed by detector 31. However, the double resonance events are modulated via $f_1$ and affect detector 31 via $f_2$ and are observed. Lock-in detection at the modulation frequency $f_m$ by means of phase sensitive amplifier 33 provides a very sensitive means of detecting microwave absorption. The output of phase-locked detector 31 is displayed on recorder 34 as a function of the frequency $f_2$.

The advantages of the absorption cell that constitutes this invention are numerous. It provides the desired high power density for the pump transition, and has a long effective path through the gas for the microwaves in a small physical space. The surface area to volume ratio is much smaller, and the nearly cubicle configuration results in most of the molecules in the sample being many mean-free paths from a surface, so that collisions with the walls are less frequent. Thus a more stable and representative gas sample is obtained, and evacuation of the cell is easier. The resonant nature of the interferometers, coupled with the physical layout, provides good isolation between pumping and observing microwave fields so that any desired combination of frequencies should be usable.

It is to be understood that the form of the invention herewith shown and described is to be taken only as an embodiment. Various changes may be made in the shape, size and arrangement of parts. For example, equivalent elements may be substituted for those illustrated and described herein, parts may be reversed and certain features of the invention may be utilized independently of the use of other features, all without departing from the spirit or scope of the invention as defined in the subjoined claims. The resonant cavities do not necessarily have to be Fabry-Perot interferometers. Other types of mirrors, such as parabolic reflectors, can be used as can other schemes for coupling microwave power in and out. The two cavities need not be of the same type, and indeed it is possible that the optimized cell will use two types of cavities, each best suited to the job it is to do. Also, it is not necessary that the propagation paths of the two microwave frequencies be at right angles to each other. It is only necessary that they share a common volume in order to observe double resonances.

We claim:

1. An absorption cell which holds the gas sample to be analyzed by microwave double resonance spectroscopy comprising:
   a vacuum-tight cell;
   a selectively sealable opening in said cell for allowing the space inside said cell to be pumped to a vacuum;
   a selectively sealable opening in said cell for allowing a sample of the gas to be analyzed to flow into the cell;
   first and second mirrors located inside said cell such that when microwave energy strikes either mirror the energy will be reflected to the other mirror;
   third and fourth mirrors located inside said cell such that when microwave energy strikes either mirror the energy will be reflected to the other mirror and such that the paths of the microwave energy reflected back and forth between said third and fourth mirrors are transverse to the paths of the microwave energy reflected back and forth between said first and second mirrors;
   an opening for microwave energy only in said cell for injecting a first microwave signal into said cell such that it strikes said second mirror;
   an opening for microwave energy only in said cell for injecting a second microwave signal into said cell such that it strikes said fourth mirror; and
   an opening for microwave energy only in said cell in a path of said second microwave signal for removing a small amount of power therefrom the analyze it.

2. An absorption cell according to claim 1 wherein any inside dimension of said cell is not more than twice any other inside dimension of the cell.

3. An absorption cell according to claim 1 wherein said second and fourth mirrors are curved to insure that any microwave energy that strikes them will be reflected to said first and third mirrors, respectively.

4. An absorption cell according to claim 1 including separate tuning means for moving said second and fourth mirrors relative to said first and third mirrors, respectively.

5. A microwave double resonant spectrometer for analyzing a gas comprising:
   a dual resonant cavity absorption cell, consisting of two Fabry-Perot interferometers arranged so that their microwave fields propagate at right angles, but with their electric field vectors parallel, which has no dimension that exceeds twice any other dimension of the cell;
   means for pumping said cell to a vacuum;
   means for injecting a sample of the gas to be analyzed into said cell;
   a first microwave pump source;
   means for connecting said first microwave source to said cell such that it propagates across said cell;
   a second microwave observing source;
   means for connecting said second microwave source to said cell such that it propagates across said cell transverse to said first microwave source;
   means for modulating said first microwave source before it is applied to said cell with a frequency $f_m$;
   means for removing a small amount of said second microwave source from said cell; and
   detector means for detecting the $f_m$ modulation of said second microwave whereby the detected $f_m$ is indicative of the characteristics of the gas being analyzed.